United States Patent

Jung et al.

Patent Number: 5,995,501
Date of Patent: Nov. 30, 1999

[54] METHOD FOR REDUCING INTERFERENCE WITHIN SIGNALING DATA OVER AN AIR INTERFACE

[75] Inventors: Stefan Jung; Peter Galyas, both of Täby, Sweden

[73] Assignee: Telefonaktiebolaget LM Ericsson (publ), Stockholm, Sweden

[21] Appl. No.: 08/770,938

[22] Filed: Dec. 20, 1996

[51] Int. Cl.$^6$ ................................................ H04L 29/08
[52] U.S. Cl. ........................ 370/350; 370/524; 375/370; 375/357
[58] Field of Search .................................... 370/350, 522, 370/469, 524, 509, 347, 468, 474; 455/422, 424, 425; 371/49.1, 68.1; 704/270; 375/222, 370, 220, 357; 1/1

[56] References Cited

U.S. PATENT DOCUMENTS

| | | | |
|---|---|---|---|
| 4,700,358 | 10/1987 | Duncanson et al. | 375/222 |
| 4,821,265 | 4/1989 | Albal et al. | 370/469 |
| 4,949,338 | 8/1990 | Albal et al. | 370/524 X |
| 5,140,616 | 8/1992 | Renner . | |
| 5,182,753 | 1/1993 | Dahlin et al. | 704/270 X |
| 5,398,246 | 3/1995 | Fujioka | 370/524 X |
| 5,557,614 | 9/1996 | Sandler et al. | 370/509 |
| 5,719,859 | 2/1998 | Kobayashi et al. | 370/347 |
| 5,818,829 | 10/1998 | Raith et al. | 370/347 |

FOREIGN PATENT DOCUMENTS

| | | |
|---|---|---|
| WO 95/12936 | 5/1995 | WIPO . |
| WO 95/33348 | 12/1995 | WIPO . |
| WO 96/19881 | 6/1996 | WIPO . |
| WO 96/20574 | 7/1996 | WIPO . |

*Primary Examiner*—Michael Horabik
*Assistant Examiner*—William H. Wilson, Jr.
*Attorney, Agent, or Firm*—Jenkens & Gilchrist, P.C.

[57] ABSTRACT

A method for protecting the transmission of network independent clocking and status information over an air interface between a mobile station and base transceiver station is disclosed. The method involves defining a parallel logical channel between the mobile station and base transceiver station to carry network independent clocking and status information. The network independent clocking and status information are removed from the data stream of the traffic channel and transmitted on the parallel channel over the air interface. Alternatively, a buffer may be used in conjunction with or singly to process the data stream of the traffic channel to delete or insert bits or characters to minimize or eliminate the need for network independent clocking information.

26 Claims, 3 Drawing Sheets

| Frame | Bit Position | E4 | E5 | E6 | E7 |
|---|---|---|---|---|---|
| MF 0a | | C1 | C2 | 1 | 0 |
| MF 1a | | C3 | C4 | C5 | 1 |
| MF 0b | | C1 | C2 | 1 | 1 |
| MF 1b | | C3 | C4 | C5 | 1 |

METHOD FOR REDUCING INTERFERENCE WITHIN SIGNALING DATA OVER AN AIR INTERFACE

BACKGROUND OF THE INVENTION

1. Technical Field of the Invention

The present invention relates to the transmission of signaling data over an air interface between a mobile station transceiver and a base station transceiver, and more particularly, to a method for protecting both network independent clocking information and status data transmitted over an air interface.

2. Description of Related Art

The GSM standard for synchronous transparent data service transmission defines two functions enabling communications between a cellular and external network. These functions enable a GSM system to accommodate a small amount of internal transmission modes and various interworking needs. The interworking function (IWF) located at the boundary between a GSM system and an external network such as a PSTN acts as an interface between the PLMN and the PSTN. On the mobile station side, the terminal adaptation function (TAF) performs the adaptation between specific terminal equipment (TE) and generic radio transmission functions.

The IWF is connected to a modem and routes a data stream to and from a PLAN using CCITT V.110 frames. The CCITT V.110 frames include data, control and status information for controlling the interconnection between the PLMN and PSTN networks. The V.110 frames are transferred through the base transceiver system (BTS) where they are channel coded and interleaved before transfer to the mobile stations (MS) over the air interface. The status and control information in the V.110 frames are handled as traffic data by the BTS and transmitted over a traffic channel. Thus, the BTS is transparent for the contents of the V.110 frames. The status and control information includes both status information and network independent clocking (NIC) information.

The network independent clocking information within the V.110 frame provides a way to control wander between the PLMN and the user generated modem signal. The wander is created due to the fact that the user generated modem signal does not have to be synchronized with the PLMN. The frequency tolerance between the modem signal and the PLMN is defined via a maximum of 100 ppm which for a 9.6 Kbit service would be approximately one bit per second. The NIC defines means for inserting or deleting a defined bit into the data stream to enable adjustment for differences between the clock rate of a user modem and the PLMN.

Status information is used for flow problem control and modem status. While this information is not as critical as the NIC information, it is important to maintain a proper flow of status data to maintain the modem connection.

A problem occurs when NIC or status information is transferred over the air interface. The air interface is subject to bit error rates at a significantly higher level then is present over the PLMN. Even with the use of redundancy coding of the information, there is still a high risk for misinterpretation of the NIC or status information when decoded. There is also the problem over a GSM air interface channel with the fast associated control channels (FACCH) which have the ability to steal bit traffic from the traffic channels over the air interface in order to assist in quickly needed call transfer procedures such as cell handovers.

These affects make it highly possible to misinterpret or completely miss either the NIC or status information. This is especially true during a FACCH steal from the traffic channel. This critical situation occurs when a call handover is performed, and an unusually high bit error rate in addition to bit stealing is present due to the performance of FACCH signaling. The affect of a missed NIC adjustment or misinterpreted NIC adjustment during handover or any other period can be fatal. The data stream would be offset between the IWF and the TAF causing the entire data streams to be misinterpreted by the receiver. Thus, there exist a need for preserving the integrity of the NIC and status information being transmitted over the air interface.

SUMMARY OF THE INVENTION

The present invention describes a method for protecting network independent clocking and status information transmitted over an air interface between a mobile station and a base transceiver station. The method involves defining a logical channel parallel to the channels of the air interface for transporting layer one signaling data between the mobile station and the base transceiver station. The layer one signaling data includes the status information and network independent clocking information normally transmitted within the data stream of the traffic channel of the air interface. The network independent clocking and status information are removed from the data stream of the traffic channel on which they are normally transmitted and transmitted to the receiving station via the parallel logical channel.

In order to maintain connection between the network independent clocking information and the data block with which it is associated, the extracted network independent clocking information is aligned with the frame number of the data block when the data block is scheduled for transmission over an air interface. Thus, when transmitted over the parallel logical channel, the data block and network independent clocking information have a fixed phase at the receiver making it possible to recombine the NIC with the data block at the receiver station.

The parallel logical channel for carrying layer one data may be defined in a number of ways. In one embodiment, status information is carried over an existing SACCH channel within the L1 header of the channel. The network independent clocking information is transmitted over an existing FACCH channel by multiplexing the layer one information with higher layer FACCH information. Alternatively, a new parallel channel uFACCH may be defined to carry only the network independent clocking information.

In a further embodiment, the reliance upon network independent clocking and status information may be minimized by routing the traffic channel data stream through buffers located at the TAF and IWF functions. The buffers are monitored for the occurrence of overrun and underrun conditions caused by differences in the timing between the user generated modem signal and PLMN modem signal. Data may be inserted or deleted from the buffers to compensate for a detected overrun or underrun condition. In this manner the need for network independent clocking information is either minimized or completely eliminated.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figures 1, 2:
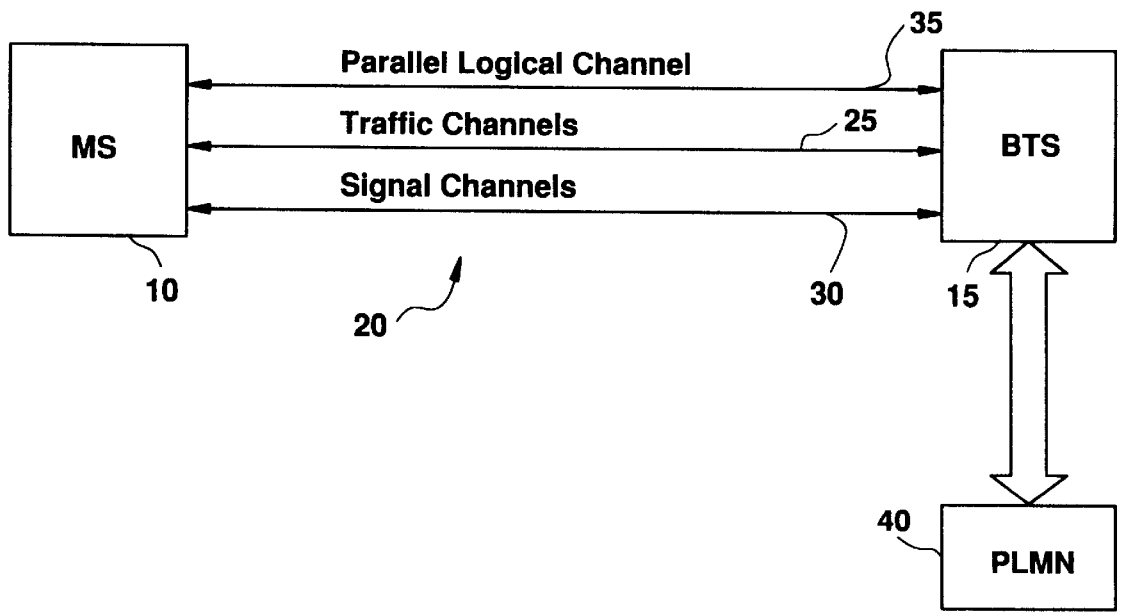
FIG. 1 illustrates an air interface between a mobile station and a parallel logical channel for handling NIC and status information.
FIG. 2 illustrates the NIC multiframe structure.

Referring now to the Drawings, and more particularly, to FIG. 1, there is illustrated a mobile station (MS) 10, base transceiver station (BTS) 15, and the air interface 20 between them. In existing systems, the protocols controlling the air interface 20 between a mobile station 10 and base transceiver station 15 define traffic channels 25 and signaling channels 30 for controlling radio transmissions between the MS and BTS. In existing systems, the traffic channels 25 include the status information and network independent clocking information necessary for controlling modem interconnections between a PLMN network 40 and the mobile station 10.

The NIC information provides a means for controlling wander between the PLMN (Public Land Mobile Network 40 and a user generated modem signal which is not synchronized with the PLMN modem signal. The rate for wander is defined to be a maximum of 100 ppm which for a 9.6 Kbits service equals approximately one bit per second according to the GSM protocol standard. The NIC information defines means for inserting or deleting a defined bit from the data stream to adjust synchronization and control wander between the user modem and PLMN 40. For a 9.6 Kbit service rate, the NIC information is sent twice per 20 millisecond time period.

Referring now also to FIG. 2, there is illustrated the NIC multiframe structure. The transmission of the NIC information occurs over a multiframe structure in bit positions E4–E7 of a V.110 frame. The multiframe structure enables one 5 bit code word to be transmitted every two V.110 frames for the purpose of network independent clocking. Positions C1–C5 define the 5 bit code words indicating either no compensation, negative compensation, positive compensation of a zero, or positive compensation of a one. Bit E-7 alternates between one and zero, with a zero being transmitted every fourth frame to indicate the beginning of a multiframe structure.

By redefining the protocols controlling the air interface, a parallel logical channel 35 is created over the air interface 20 that is defined in such a way that the risk for misinterpretation of the sensitive NIC and status information is minimized. The NIC and status information may then be transmitted over the parallel logical channel 35 to protect this information. By sending the signaling information on the parallel logical channel 35, bandwidth is freed within the traffic channel 25 making it possible to increase the bandwidth on existing channel coding algorithms. For example, on a TCH/F9.6 channel, the data bandwidth would be increased by 25% from 9.6 Kbits to 12 Kbits.

Figure 3A:
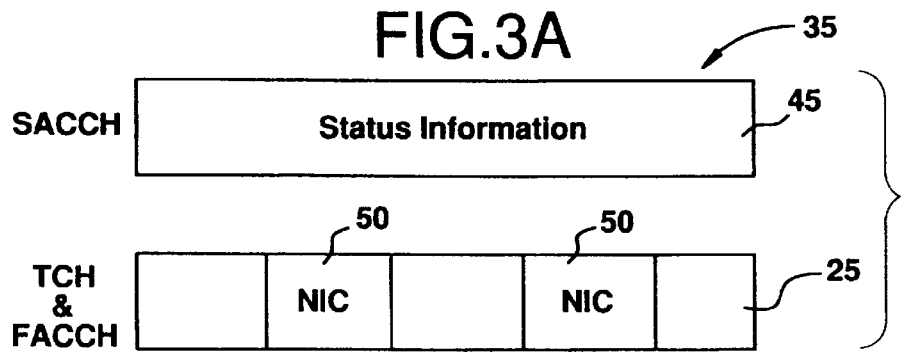
FIG. 3a illustrates a first embodiment of the invention wherein status information is transmitted on the SACCH channel and NIC information is transmitted on a FACCH channel.
Figure 3B:
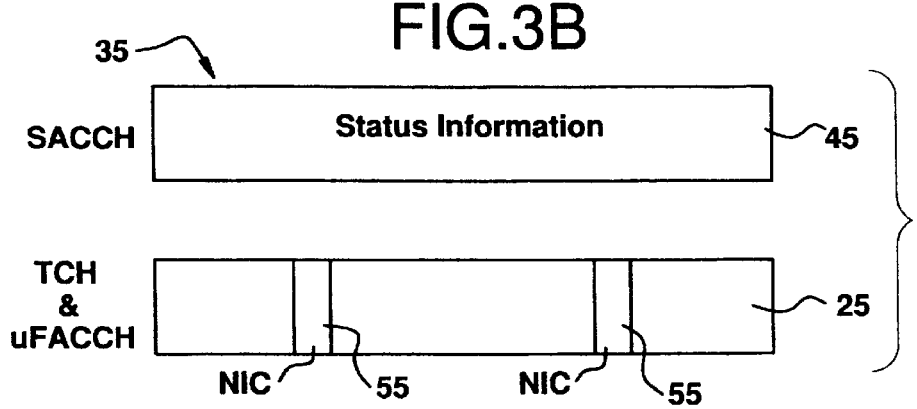
FIG. 3b illustrates an alternative embodiment of the invention wherein status information is transmitted on a SACCH channel and NIC information is transmitted on a separate channel uFACCH.

Referring now to FIG. 3a, there is illustrated a first embodiment for implementing a parallel logical channel 35 on the air interface 20 containing the NIC and status information. While the following discussions with respect to FIGS. 3a–3b, are shown as separate side-by-side channels, it is of course to be understood that each channel, except where otherwise noted, is transferred within one of the timeslots of a TDMA frame. In a first embodiment, the parallel logical channel 35 comprises a combination of already existing slow associated control channel (SACCH) 45 and the fast associated control channel (FACCH) 50 stealing bit positions from the bit stream of the traffic channel 25.

The SACCH 45 is transmitted on both the uplink and downlink between the mobile station 10 and base transceiver station 15. On the uplink the MS 10 normally transmits information on the signaling strength and quality of the base station signal with which it is presently in contact and the signal strength of neighboring base stations. On the downlink the MS 10 receives information on which transmitting power to utilize and also receives instructions on the timing advance.

The FACCH 50 is used to facilitate a conversation handover between cells. The FACCH 50 works in a stealing mode, meaning that a 20 millisecond segment of speech within the traffic channel 25 is exchanged for signaling information necessary for handover. This lost speech information is not recovered, but is not significant when comprising only speech data. This of course is not the case if NIC or status information is lost during a data call, as discussed previously.

Status information is placed on the SACCH 45 while the FACCH 50 contain the NIC information to be associated with a defined bit in the data stream. The use of the SACCH 45 provides a truly parallel channel while use of the FACCH 50 merely utilizes the traffic channel 25 by stealing a data slot therefrom on the air interface. The stealing of traffic data is corrected by a channel coding scheme under good radio conditions.

Figure 4:
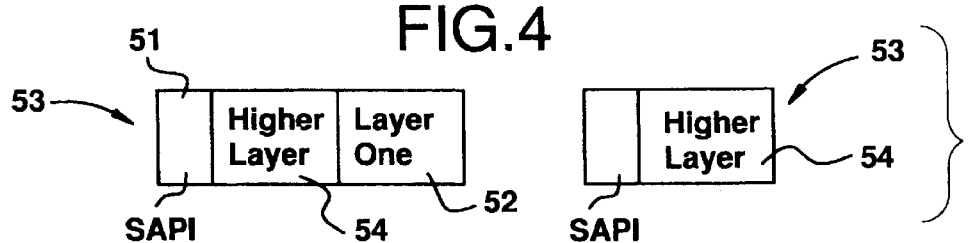
FIG. 4 illustrates how FACCH layer one and higher layer information are multiplexed together in the FACCH.

Both the SACCH 45 and FACCH 50 are normally defined to carry information related to higher layers. By defining them to be carriers for layer one signaling, a new logical layer one channel is defined. The layer one FACCH 52 and higher layer FACCH 54 are multiplexed together within the stolen 20 millisecond segment 53 of the traffic channel 25 as shown in FIG. 4. To be able to distinguish between the data within the new layer one associated FACCH 52 and the presently existing FACCH data 54 for call handovers, a unique SAPI Indicator 51 would be used to identify the FACCH data within a segment 53.

Referring now to FIG. 3b, in an alternative embodiment, interface protocols may be redefined to include a new channel designated as uFACCH 55. The uFACCH channel 55 has a reduced bandwidth and defines only layer one information in order to minimize the number of bits stolen by the FACCH block from the TCH and avoid mixing information (layer one and higher layers) within already defined signaling channels. Thus, the uFACCH 55 would comprise a signaling channel separate and apart from FACCH 50. The NIC information is transmitted within the new uFACCH channel 55, while the status information is transmitted over the SACCH channel 45, as discussed previously.

The status information is included within the L1 header of the existing SACCH channel 45, or alternatively, could be transmitted with the NIC information within the FACCH 50 or uFACCH 55 channels. The status information is transmitted over the SACCH channel 45 at regularly scheduled intervals, rather than over the existing FACCH or newly defined uFACCH channel because the information is not strictly time critical. This is due to the fact that the modem status information is not directly tied to the data within the data stream.

In order to further increase the security of the status information and NIC information, an acknowledge procedure with a retransmission process can be applied in the manner similarly defined for messages of higher layer. In one example.

Figure 5:
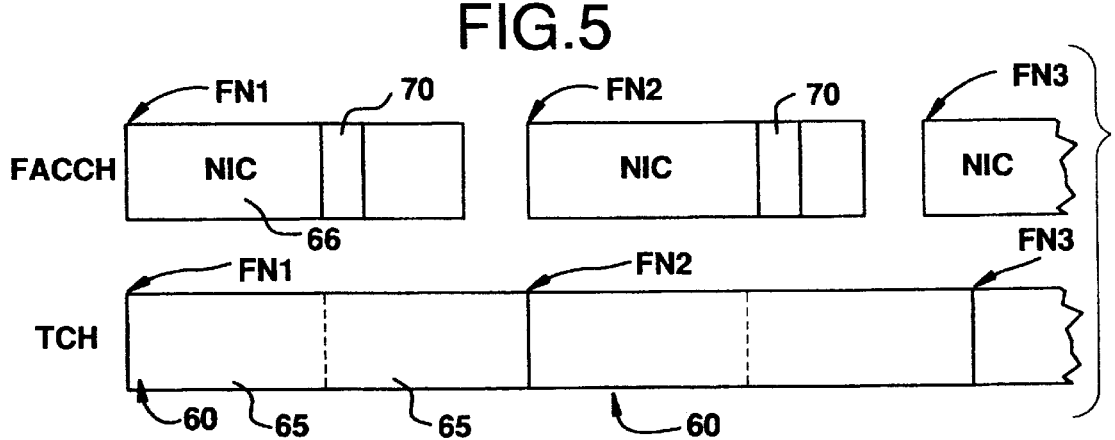
FIG. 5 illustrates how NIC information and associated TCH data blocks are aligned using frame numbers.

The NIC information is directly tied to the data, and more specifically, to particular data bit positions within the V.110 frame. CCITT V.100 multiframe structure and channel coding blocks are not synchronized. Each TCH data block will include 2 or 4 (depending on the coding rate) V.110 frame within it. When the NIC information is separated from the TCH data block the NIC information must be tied to the data stream in some manner. In order to accomplish this, the FACCH 50 or uFACCH 55 channel are aligned with the TCH data blocks using the frame number (FN) numbering of the air interface as shown in FIG. 5.

Each TCH data block 60 further include either four or two CCITT V.110 frames 65 depending upon the data rate utilized. As the NIC information within each V.110 frame pair containing an adjustment order is removed and placed on an FACCH 50 or uFACCH 55 channel the NIC information 66 is aligned with the TCH data blocks 60 containing the data associated with the NIC information using the FN frame number from which the NIC was taken. This makes it possible to merge the data at the receiver end. Also included within the NIC information 60 must be an indication 70 of which V.110 frame 65 within the TCH Block 60 the NIC information applies.

By aligning the NIC information 66 within the parallel logical channel with its associated data block 60, it is possible to merge the NIC information with the associated TCH data blocks at the BTS into the TRAU frames for transmission to the TRAU and IWF. In the downlink direction, the BTS divides the user data from the NIC information and transmits them on the two separate channels as discussed in FIGS. 3a and 3b. The channels only transmit when status information or NIC adjustments must be transferred. The mobile station 10 then utilizes the alignment based upon the FN numbering in order to synchronize the signaling data to a user data string.

Figure 6:
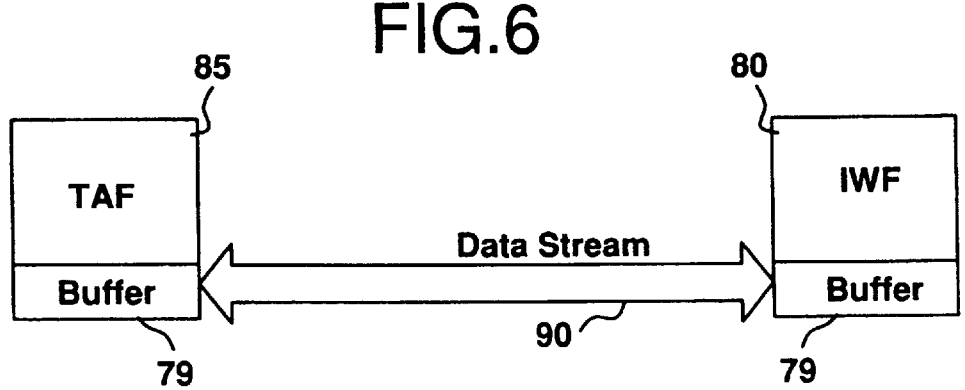
FIG. 6 illustrates an alternative embodiment for preserving NIC information using buffers within the TAF and IWF.

Referring now to FIG. 6, there is illustrated an alternative embodiment wherein a buffer 79 is included within the IWF 80 and TAF 85 of the system. The TAF 85 is normally associated with the mobile station while the IWF is associated with the base transceiver station. The traffic channel data stream 90 is routed through the buffers 79 in both the uplink and downlink directions in order to minimize or eliminate the need for NIC information within the system. By buffering the data, time variations can be monitored and handled up to the size of the buffer when either an overrun or underrun condition occurs.

Figure 7:
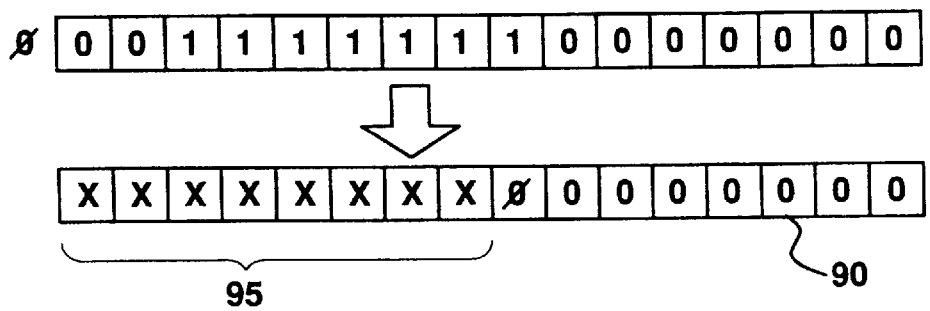
FIG. 7 illustrates an overrun condition within a buffer.
Figure 8:
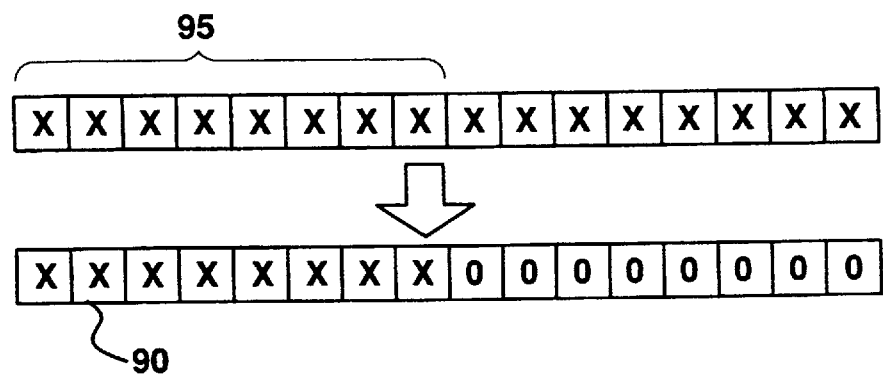
FIG. 8 illustrates an underrun condition within a buffer.

During an overrun condition, data would be deleted from the buffer in order to realign the data and eliminate wander, as shown generally in FIG. 7. The case of FIG. 7 denotes deleting an entire character 95 to cure an overrun condition, but a single bit or bits 90 may also be deleted. In the case of an underrun condition, redundant data would be inserted into the data stream to realign the data stream as shown in FIG. 8. FIG. 8 shows the insertion of an entire character 95 but data may also be inserted on a bit 90 basis. The protocol would define a new NIC scheme to indicate the addition or subtraction made from the data stream. This NIC and status information may be transferred on the parallel logical channel discussed previously with respect to FIGS. 1–5, or may be transferred within the current V.110 multiframe structure.

In a further embodiment of the buffer configuration, the use of NIC information may be completely eliminated by merely inserting or discarding data within the buffer as shown in FIGS. 7 and 8. In order to prevent introduction of phase shift into the data stream, the manner in which data is packed into CCITT V.110 frames has to be modified in order to insure that no offset is introduced when either inserting or discarding data. In other words, the realignment of the buffer must be made by saving the character phase of the bit stream. This results in adjustments involving removing or adding one or more characters rather than individual bits.

Thus, rather than removing or inserting a single bit 90 an entire character 95 is inserted or deleted.

Under this NIC-less situation, both the TAF 85 and IWF 80 are set to not transfer or respond to NIC adjustments. The transmitting unit shall always transfer NIC information with no compensation value, and the receiver shall not be sensitive to any NIC adjustment.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for protecting network independent clocking and status information transmitted over an air interface between a mobile station and a base transceiver station, comprising the steps of:

defining a logical channel parallel to a traffic channel for transporting layer one signaling data between the mobile station and the base transceiver station;

removing network independent clocking and status information from a data stream of the traffic channel transmitted on the air interface; and transmitting the removed network independent clocking and status information over the logical channel parallel to the traffic channel.

2. The method of claim 1 wherein the step of defining further comprises the steps of:

defining a SACCH channel to carry layer one status information; and defining an existing FACCH channel to carry layer one network independent clocking information.

3. The method of claim 2 wherein the step of transmitting further comprises the steps of:

transmitting the status information over the SACCH channel;

multiplexing existing FACCH higher layer data with layer one networking independent clocking information; and transmitting the multiplexed data over the FACCH channel.

4. The method of claim 3 wherein the multiplexed higher layer and layer one data are identified by an SAPI indicator.

5. The method of claim 2 wherein the status information is transmitted in the L1 header of the SACCH channel.

6. The method of claim 1 wherein the step of defining further comprises the steps of:
   defining a SACCH channel to carry layer one status information; and
   defining an UFACCH channel separate from normal FACCH channels to carry layer one network independent clocking information.

7. The method of claim 1 wherein the step of defining further comprises defining an existing FACCH channel to carry layer one status and network independent clocking information.

8. The method of claim 1 wherein the step of defining further comprises defining an uFACCH channel to carry layer one status and network independent clocking information.

9. The method of claim 1, further including the step of aligning the removed network independent clocking information with a data block of associated data within the traffic channel from which the network independent clocking information was taken using the frame number synchronization of the air interface.

10. The method of claim 9, further including the step of providing an indication of from which V.110 frame within the data block the transmitted network independent clocking information was removed.

11. The method of claim 1, further including the steps of passing a data stream from the data channel through buffers at the mobile station and base transceiver station to limit a need of network independent clocking adjustments.

12. The method of claim 11 wherein the step of passing further includes the step of deleting at least one bit from the data stream within the buffers in an event of an overrun condition in the buffers.

13. The method of claim 11 wherein the step of passing further includes the step of adding at least one bit to the data stream within the buffers in an event of an underrun condition in the buffers.

14. A method for protecting data transmitted over the air interface between a mobile station and base transceiver station, comprising the step of:
   defining a logical channel parallel to a traffic channel of the air interface for transporting network independent clocking information between the mobile station and the base transceiver station;
   extracting network independent clocking information from a data block within a data stream within the traffic channel; and
   transmitting the extracted network independent clocking information over the parallel logical channel such that the extracted network independent clocking information is aligned with the data block on the traffic channel from which the network independent clocking information was extracted.

15. The method of claim 14 wherein the step of defining further comprises the step of defining an existing FACCH channel to carry layer one network independent clocking information.

16. The method of claim 15 wherein the step of transmitting further comprises the steps of:
   multiplexing existing FACCH higher layer data with layer one networking independent clocking information; and
   transmitting the multiplexed data over the FACCH channel.

17. The method of claim 16 wherein the multiplexed higher layer and layer one data are identified by an SAPI indicator.

18. The method of claim 14 wherein the step of defining further comprises the step of defining an uFACCH channel separate from normal FACCH channels to carry layer one network independent clocking information.

19. The method of claim 14, further including the step of providing with the extracted network independent clocking information an indication of from which V.110 frame within the data block the transmitted network independent clocking information was extracted.

20. A method for protecting network independent clocking information transmitted over an air interface between a mobile station and a base transceiver station, comprising the steps of:
   routing a traffic channel data stream in the air interface through buffers located at the mobile station and the base transceiver station;
   monitoring the buffers for occurrence of an overrun or underrun condition caused by difference in timing of a user generated modem signal and a PLMN; and
   modifying the data stream by adding or subtracting data to/from the data stream contained within the buffers to account for the differences in timing.

21. The method of claim 20 wherein the step of modifying further includes the step of deleting at least one bit from the data stream within the buffers in an event of an overrun condition in the buffers.

22. The method of claim 20 wherein the step of modifying further includes the step of adding at least one bit to the data stream within the buffers in an event of an underrun condition in the buffers.

23. The method of claim 20 wherein the step of modifying further includes the step of deleting at least one character from the data stream within the buffer in an event of an overrun condition.

24. The method of claim 20 wherein the step of modifying further includes the step of adding at least one character from the data stream within the buffer in an event of an overrun condition.

25. The method of claim 20, further including the step of modifying the NIC information to account for modifications of the data stream within the buffers.

26. The method of claim 20, further including the step of modifying the mobile station and base transceiver station to ignore network independent clocking adjustments.

* * * * *

UNITED STATES PATENT AND TRADEMARK OFFICE
CERTIFICATE OF CORRECTION

PATENT NO.   : 5,995,501
DATED        : November 30, 1999
INVENTOR(S)  : Jung et al.

It is certified that error appears in the above-identified patent and that said Letters Patent is hereby corrected as shown below:

Column 1,
Line 28, replace "PLAN" with -- PLMN --

Column 7,
Line 9, replace "UFACCH" with -- uFACCH --

Signed and Sealed this

Nineteenth Day of February, 2002

Attest:

JAMES E. ROGAN
Attesting Officer    Director of the United States Patent and Trademark Office